United States Patent
Jiang et al.

(10) Patent No.: US 10,897,703 B2
(45) Date of Patent: Jan. 19, 2021

(54) CAPABILITY INFORMATION REPORTING METHOD, RELEVANT DEVICES AND SYSTEM

(71) Applicant: VIVO MOBILE COMMUNICATION CO., LTD., Guangdong (CN)

(72) Inventors: Dajie Jiang, Chang'an Dongguan (CN); Fei Qin, Chang'an Dongguan (CN); Xian Cui, Chang'an Dongguan (CN); Baigang Wang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/617,821

(22) PCT Filed: May 7, 2018

(86) PCT No.: PCT/CN2018/085839
§ 371 (c)(1),
(2) Date: Nov. 27, 2019

(87) PCT Pub. No.: WO2018/219099
PCT Pub. Date: Dec. 6, 2018

(65) Prior Publication Data
US 2020/0112853 A1 Apr. 9, 2020

(30) Foreign Application Priority Data
May 27, 2017 (CN) .......................... 2017 1 0393798

(51) Int. Cl.
*H04L 5/14* (2006.01)
*H04W 8/24* (2009.01)

(52) U.S. Cl.
CPC ................. *H04W 8/24* (2013.01); *H04L 5/14* (2013.01)

(58) Field of Classification Search
CPC ....................................................... H04W 8/24
See application file for complete search history.

(56) References Cited

U.S. PATENT DOCUMENTS 9,350,477 B1* 5/2016 Jung .................... H04W 72/082
9,654,274 B2 5/2017 Park et al.
(Continued)

FOREIGN PATENT DOCUMENTS

CN 101534518 A 9/2009
CN 102577474 A 7/2012
(Continued)

OTHER PUBLICATIONS

CN Office Action dated Nov. 19, 2019 as received in Application No. 201710393798.4.
(Continued)

*Primary Examiner* — Michael T Vu
(74) *Attorney, Agent, or Firm* — Maschoff Brennan

(57) ABSTRACT

A capability information reporting method, relevant devices and a system are provided. The capability information reporting method includes: acquiring a predicted frequency range of an intra-UE interference; and receiving intra-UE interference suppression capability information with respect to the intra-UE interference from the UE. The intra-UE interference suppression capability information includes intra-UE interference suppression capability information about the UE within the predicted frequency range.

20 Claims, 8 Drawing Sheets

(56) References Cited

U.S. PATENT DOCUMENTS 9,973,325 B2\* 5/2018 Sorrentino ........ H04W 56/0045
2012/0155341 A1 6/2012 Yamamoto et al.
2014/0133411 A1 5/2014 Park et al.

FOREIGN PATENT DOCUMENTS

| CN | 104902485 A | 9/2015 |
| CN | 105191188 A | 12/2015 |
| CN | 1051981188 A | 12/2015 |
| CN | 106357297 A | 1/2017 |
| GB | 2499259 A | 8/2013 |
| WO | 2015/077987 A1 | 6/2015 |
| WO | 2016/140607 A1 | 9/2016 |

OTHER PUBLICATIONS

CN Office Action in Application No. 201710393798.4 dated Nov. 19, 2019.
CN Search report in Application No. 201710393798.4 dated Apr. 25, 2019.
Written Opinion and International Search Report in Application No. PCT/CN2018/085839 dated Dec. 12, 2019.

\* cited by examiner

CAPABILITY INFORMATION REPORTING METHOD, RELEVANT DEVICES AND SYSTEM

CROSS-REFERENCE TO RELATED APPLICATION

The present application is the U.S. national phase of PCT Application No. PCT/CN2018/085839 filed on May 7, 2018, which claims a priority of the Chinese patent application No. 201710393798.4 filed on May 27, 2017, which is incorporated herein by reference in its entirety.

TECHNICAL FIELD

The present disclosure relates to the field of communication technology, in particular to a capability information reporting method, relevant devices, and a system.

BACKGROUND

Due to such a problem as interference that always exists in the communication technology, communication performance of a User Equipment (UE) is adversely affected. The common interference includes inter-UE interference and inter-system interference. However, along with the development of the communication technology and the increasing demand on the performance of the UE, intra-UE interference has attracted more and more attentions. The so-called intra-UE interference refers to, due to imperfection of a radio frequency devices, an interference caused by a signal transmitted by the UE itself, e.g., a high-order signal component, on a signal received by the UE itself. For example, an uplink signal from the UE may interfere a downlink signal for the UE. Hence, there is an urgent need to acquire relevant information about the intra-UE interference.

SUMMARY

An object of the present disclosure is to provide a capability information reporting method, relevant devices and a system, so as to acquire the relevant information about the intra-UE interference.

In one aspect, the present disclosure provides in some embodiments a capability information reporting method, including: acquiring a predicted frequency range of an intra-UE interference; and receiving intra-UE interference suppression capability information from the UE. The intra-UE interference suppression capability information includes intra-UE interference suppression capability information about the UE within the predicted frequency range.

In another aspect, the present disclosure provides in some embodiments a capability information reporting method for a UE, including transmitting intra-UE interference suppression capability information with respect to an intra-UE interference to a network side device. The intra-UE interference suppression capability information includes intra-UE interference suppression capability information about the UE within a predicted frequency range, and the UE is to be influenced by the intra-UE interference within the predicted frequency range.

In yet another aspect, the present disclosure provides in some embodiments a network side device, including: an acquisition module configured to acquire a predicted frequency range of an intra-UE interference; and a reception module configured to receive intra-UE interference suppression capability information with respect to the intra-UE interference from the UE. The intra-UE interference suppression capability information includes intra-UE interference suppression capability information about the UE within the predicted frequency range.

In still yet another aspect, the present disclosure provides in some embodiments a UE, including a transmission module configured to transmit intra-UE interference suppression capability information with respect to an intra-UE interference to a network side device. The intra-UE interference suppression capability information includes intra-UE interference suppression capability information about the UE within a predicted frequency range, and the UE is to be influenced by the intra-UE interference within the predicted frequency range.

In still yet another aspect, the present disclosure provides in some embodiments a network side device, including a processor, a memory, a transceiver and a user interface. The processor, the memory, the transceiver and the user interface are coupled together via a bus system. The processor is configured to read a program stored in the memory, so as to implement the above-mentioned capability information reporting method.

In still yet another aspect, the present disclosure provides in some embodiments a UE, including a processor, a memory, a network interface and a user interface. The processor, the memory, the network interface and the user interface are coupled together via a bus system. The processor is configured to read a program stored in the memory, so as to implement the above-mentioned capability information reporting method.

In still yet another aspect, the present disclosure provides in some embodiments an interference processing system, including the above-mentioned network side device and the above-mentioned UE.

In still yet another aspect, the present disclosure provides in some embodiments a computer-readable storage medium storing therein a resource configuration program. The resource configuration program is executed by a processor so as to implement the above-mentioned capability information reporting method.

In still yet another aspect, the present disclosure provides in some embodiments a computer-readable storage medium storing therein a resource configuration program. The resource configuration program is executed by a processor so as to implement the above-mentioned capability information reporting method.

According to the embodiments of the present disclosure, the predicted frequency range of the intra-UE interference may be acquired, and then the intra-UE interference suppression capability information with respect to the intra-UE interference may be received from the UE. The intra-UE interference suppression capability information may include intra-UE interference suppression capability information about the UE within the predicted frequency range. As a result, it is able to acquire the intra-UE interference suppression capability information about the UE.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" is merely used to describe the relationship between objects, and it may include three situations. For example, "A and/or B" may represent that, there is only A, there are both A and B, and there is only B.

Such expressions as "illustrative" and "for example" are merely used to show examples or explanations. Any illustrative embodiment or scheme in the present disclosure shall not be construed as being superior over the other embodiment or scheme. Definitely, these words intend to exhibit relevant concepts in a concrete manner.

The present disclosure will be described hereinafter in conjunction with the drawings and embodiments. A capability information reporting method, relevant devices and a system provided in the embodiments of the present disclosure may be applied to a wireless communication system, e.g., $5^{th}$-Generation (5G) system, an Evolved Long Term Evolution (eLTE) system, or any other evolved communication system that may occur in future.

Figure 1:
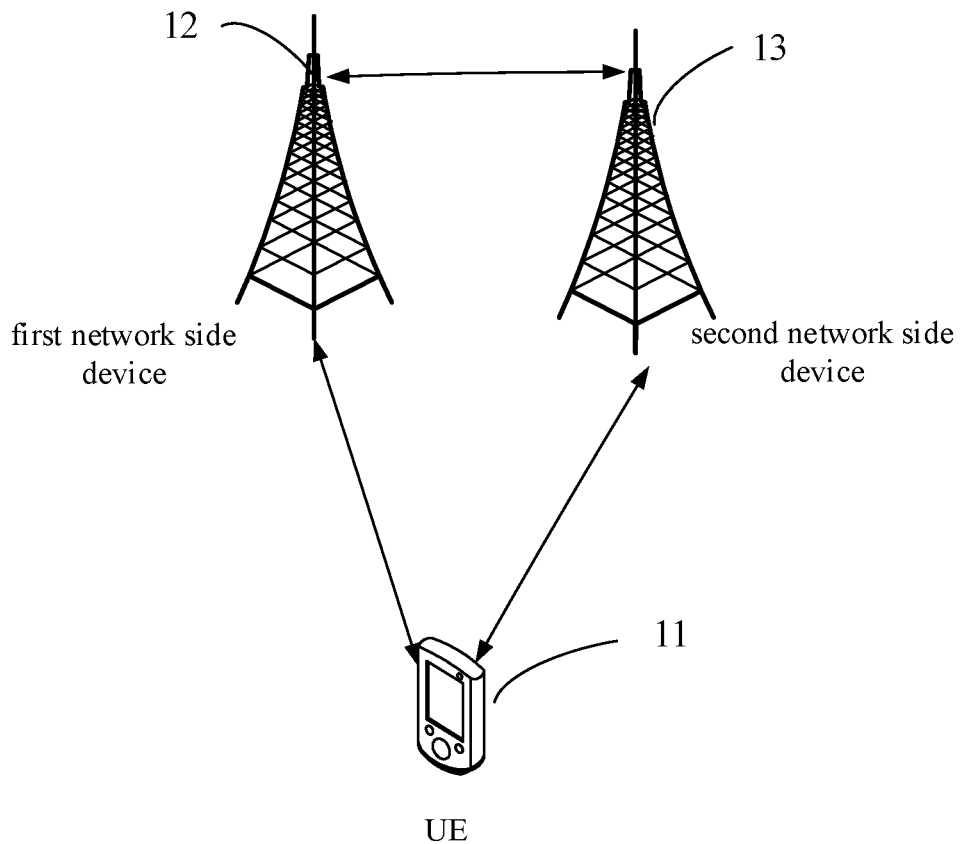
FIG. 1 is a schematic view showing an available network system according to one embodiment of the present disclosure.

The present disclosure provides an available network system which, as shown in FIG. 1, includes a UE 11, a first network side device 12 and a second network side device 13. The UE 11 may be a user equipment, such as a mobile phone, a tablet personal computer, a laptop computer, a Personal Digital Assistant (PDA), a Mobile Internet Device (MID) or a wearable device. It should be appreciated that, the type of the UE 11 will not be particularly defined herein. The UE 11 may communication with the first network side device 12 and the second network side device 13 simultaneously. The first network side device 12 may be a network side device in a first system, e.g., a base station in the first system, and the base station may be a macro base station, e.g., an evolved Node B (eNB) in an LTE system or a gNB in a 5G New Radio (NR) system. In addition, the first network side device 12 may also be an Access Point (AP). The second network side device 13 may be a network side device in a second system, e.g., a base station in the second system, and the base station may be a macro base station, e.g., the eNB in the LTE system or the gNB in the 5G NR system. It should be appreciated that, the types of the first network side device 12 and the second network side device 13 will not be particularly defined herein. In addition, the first system may be the LTE system, and the second system may be the 5G NR system. In some embodiments of the present disclosure, the first system and the second system may be tightly coupled with each other in a Dual Connectivity (DC) mode. One of the two system may serve as a Master Node (MN), and the other may serve as a Secondary Node (SN). In a DC system, two cell groups, i.e., a Master Cell Group (MCG) and a Secondary Cell Group (SCG), may be provided. The MCG may include a Primary Cell (PCell) and one or more Secondary Cell (SCell). The SCG may include one Primary Secondary Cell (PSCell) and one or more SCells.

In the above network system, data transmission may be performed between the UE 11 and the first network side device 12 as well as the second network side device 13 simultaneously, or at different time points, which will not be particularly defined herein.

Figure 2:
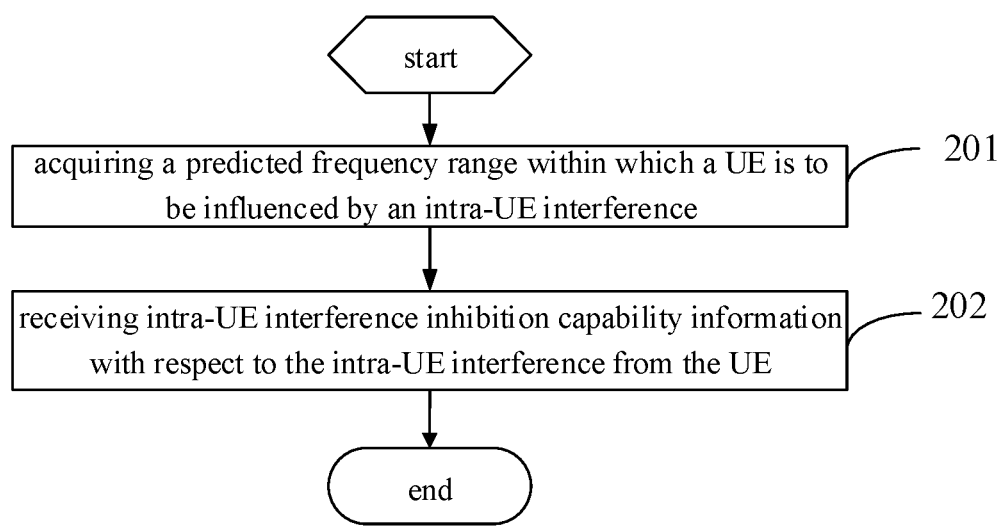
FIG. 2 is a flow chart of a capability information reporting method according to one embodiment of the present disclosure.

The present disclosure provides in some embodiments a capability information reporting method which, as shown in FIG. 2, includes the following steps.

Step 201: acquiring a predicted frequency range of an intra-UE interference.

The predicted frequency range may be understood as a frequency range of the intra-UE interference, i.e., the frequency range may be predictable. For example, the UE may predict the predicted frequency range before signal transmission, so as to acquire the frequency range of the intra-UE interference. Of course, the predicted frequency range may also be a frequency range of the intra-UE interference which was previously recorded before Step 201.

In addition, the intra-UE interference may refer to an interference caused by a signal transmitted by the UE itself, e.g., an uplink signal, on a signal received by the UE itself, e.g., a downlink signal.

Step 202: receiving intra-UE interference suppression capability information with respect to the intra-UE interference from the UE. The intra-UE interference suppression capability information may include intra-UE interference suppression capability information about the UE within the predicted frequency range.

The intra-UE interference suppression capability information may be used to indicate an intra-UE interference suppression capability of the UE with respect to the intra-UE interference, e.g., an isolation performance, indication information indicating whether an isolation performance capability of the UE meets a predetermined intra-UE interference suppression capability index requirement, reception signal sensitivity, or indication information indicating receiving signal sensitivity degradation of the UE, which will not be particularly defined herein. In addition, the intra-UE interference suppression capability information may be reported by the UE on its own initiative, or reported by the UE upon the reception of an inquiry message from a network side device. The isolation performance may be a value acquired by subtracting power of an interference source signal received via an interfered link (i.e., a value of a generated interference) from transmission power for an interference source link. For example, when the UE transmits a signal at a frequency point A with transmission power of 20 dBm and receives the signal at a frequency point B with power (the value of the interference) is −40 dBm, the isolation performance may be 60 dB. Of course, in some embodiments of the present disclosure, the isolation performance may also be understood as isolation of the intra-UE interference.

The intra-UE interference suppression capability information may be detected on one or more Resource Blocks (RBs), one or more subcarriers, or one or more Physical Resource Block (PRBs) within the predicted frequency range, so as to report the intra-UE interference suppression capability information via a narrow band. In addition, the intra-UE interference suppression capability information may also be reported via a wide band, e.g., the intra-UE interference suppression capability information detected on each PRB or a group of PRBs within the predicted frequency range may be reported.

In addition, the intra-UE interference suppression capability information may be the isolation performance capability of the UE with respect to the intra-UE interference, e.g., an intermodulation interference or a harmonic interference, and the isolation performance capability may be detected by a manufacturer before the UE has left the factory and then stored in the UE. The isolation performance capability may be a specific isolation value, or whether the UE meets an isolation performance requirement on the intra-UE interference, e.g., the intermodulation interference or the harmonic interference, defined in a third-party organization, e.g., the $3^{rd}$-Generation Partnership Projection (3GPP). After the UE has accessed to a network, it may report the isolation performance capability on its own initiative or upon the reception of the inquiry message from the network side device. Then, the network side device may perform a scheduling operation or an interference avoiding operation in accordance with the isolation performance capability reported by the UE.

It should be appreciated that, upon the reception of the intra-UE interference suppression capability information, the network side device may perform or not perform the corresponding interference avoiding operation. For example, when the intra-UE interference suppression capability information indicates that the UE has a strong interference suppression capability and the performance of the UE is not significantly affected by the intra-UE interference, the network side device may not perform the interference avoiding operation. When the intra-UE interference suppression capability information indicates that the UE has a weak interference suppression capability and the performance of the UE is significantly affected by the intra-UE interference, the network side device may perform the interference avoiding operation.

It should be appreciated that, the above-mentioned capability information reporting method may be applied to a network side device, e.g., the first network side device 12 or the second network side device 13 in FIG. 1. Message interaction may be further performed between the two network side devices, so as to further reduce the influence caused by the intra-UE interference.

According to the embodiments of the present disclosure, the predicted frequency range of the intra-UE interference may be acquired, and then the intra-UE interference suppression capability information with respect to the intra-UE interference may be received from the UE. The intra-UE interference suppression capability information may include intra-UE interference suppression capability information about the UE within the predicted frequency range. As a result, it is able to acquire the intra-UE interference suppression capability information about the UE.

Figure 3:
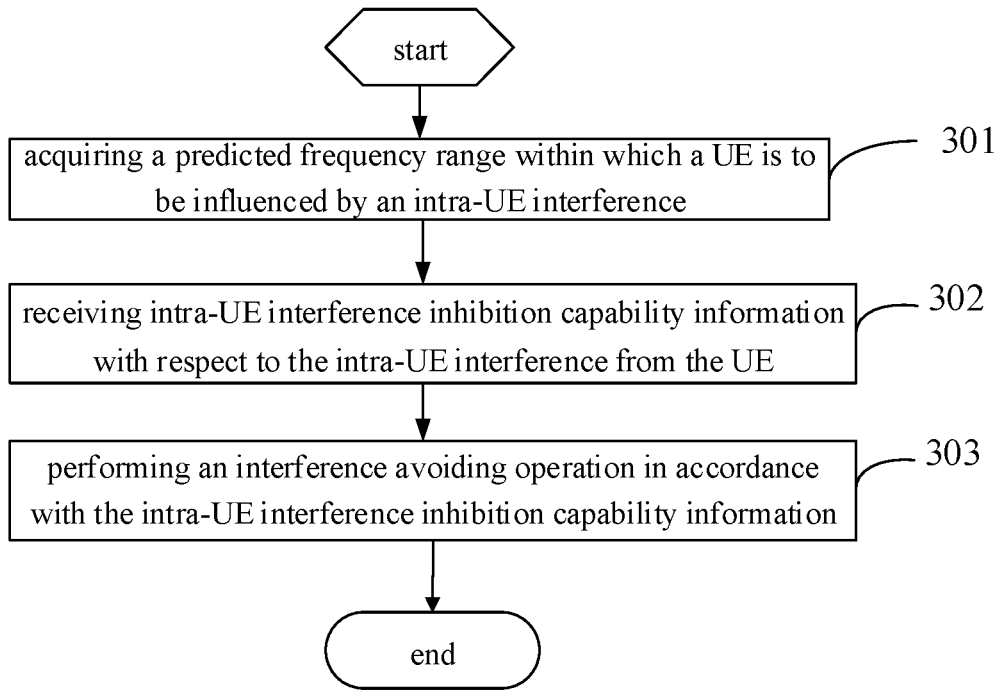
FIG. 3 is another flow chart of the capability information reporting method according to one embodiment of the present disclosure.

The present disclosure further provides in some embodiments a capability information reporting method which, as shown in FIG. 3, includes the following steps.

Step 301: acquiring a predicted frequency range of an intra-UE interference.

The acquiring the predicted frequency range of the intra-UE interference may include calculating a first candidate predicted frequency range of the intra-UE interference in accordance with an uplink operating frequency range of a first system, and taking a first target frequency range within the first candidate predicted frequency range as the predicted frequency range. The first target frequency range may be a frequency range located within the first candidate predicted frequency range and belonging to a downlink system bandwidth of a second system for the UE. The first system may be an LTE system, and the second system may be a 5G NR system. Of course, in some embodiments of the present disclosure, the first system and the second system may each be any communication system other than the LTE system and the 5G NR system.

The calculating the first candidate predicted frequency range of the intra-UE interference within the uplink operating frequency range of the first system may include determining the first candidate predicted frequency range in accordance with the uplink operating frequency range and a frequency range of interference. In addition, the first candidate predicted frequency range may also be acquired through specific calculation on the uplink operating frequency range of the first system. For example, when the uplink operating frequency range of the first system (e.g., an LTE uplink frequency range) is 1720 MHz to 1740 MHz, the frequency range of a second harmonic interference may be 3440 MHz to 3480 MHz, i.e., 1720 MHz and 1740 MHz may each be multiplied by 2. It should be appreciated that, the first candidate predicted frequency range may be understood as a frequency range within which the UE is possibly to be influenced by the intra-UE interference within the uplink operating frequency range of the first system.

Then, a frequency range located within the range of 3440 MHz to 3480 MHz and belonging to the downlink system bandwidth of the second system may be selected as the predicted frequency range. For example, the downlink system bandwidth of the second system (e.g., the 5G NR system) is 3460 MHz to 3500 MHz, frequency points at which the UE is possibly to be influenced by the second harmonic interference, i.e., the predicted frequency range, may be finally determined as 3460 MHz to 3480 MHz, i.e., the UE may be possibly influenced by the intra-UE interference within the range of 3460 MHz to 3480 MHz. The downlink system bandwidth of the second system may be determined in accordance with a central frequency point and a second system bandwidth of a network side device.

Alternatively, the acquiring the predicted frequency range of the intra-UE interference may include calculating a second candidate predicted frequency range of the intra-UE interference in accordance with the uplink operating frequency range of the first system and an uplink operating frequency range of the second system, and taking a second target frequency range within the second candidate predicted frequency range as the predicted frequency range. The second target frequency range may be a frequency range located within the second candidate predicted frequency range and belonging to a downlink system bandwidth of the first system for the UE.

The intra-UE interference within the uplink operating frequency range of the first system and the uplink operating frequency range of the second system may refer to an intra-UE interference generated when an uplink signal is transmitted by the UE at an uplink operating frequency of the first system and an uplink operating frequency of the second system simultaneously. Of course, the second candidate predicted frequency range may be predictable, i.e., the UE may, before transmitting the uplink signal at the uplink operating frequency of the first system and the uplink operating frequency of the second system simultaneously, determine the frequency range of the intra-UE interference generated when the uplink signal is transmitted by the UE at the uplink operating frequency of the first system and the uplink operating frequency of the second system simultaneously.

In addition, the calculating the second candidate predicted frequency range of the intra-UE interference in accordance with the uplink operating frequency range of the first system and the uplink operating frequency range of the second system may include determining the second candidate predicted frequency range in accordance with the uplink operating frequency ranges and a frequency range of the interference. Alternatively, the second candidate predicted frequency range may be acquired through specific calculation on the uplink operating frequency range of the first system and the uplink operating frequency range of the second system. For example, the first system is the LTE system, the second system is the 5G NR system, and the UE accesses to the LTE system and the NR in a DC mode. When the uplink operating frequency range of the LTE system is 1720 MHz to 1740 MHz and the uplink operating frequency range of the 5G NR system is 3485 MHz to 3525 MHz, a frequency point range of an intermodulation interference may include LTE downlink frequency points 1745 MHz (i.e., 3485-1740) to 1805 MHz (i.e., 3525-1720), i.e., the second candidate predicted frequency range may be acquired through subtracting a boundary frequency point of the uplink operating frequency range of the second system from a boundary frequency point of the uplink operating frequency range of the first system. Then, frequency points at which the UE is possibly to be influenced by the intermodulation interference, i.e., the predicted frequency range, may be finally determined as 1765 MHz to 1775 MHz in accordance with a central point and a LTE system bandwidth of the network side device (e.g., the LTE system bandwidth is 1765 MHz to 1775 MHz), i.e., the UE may be possibly influenced by the intra-UE interference within the range of 1765 MHz to 1775 MHz.

For example, when the first system is the LTE system and the second system is the 5G NR system, the first candidate predicted frequency range and the second candidate predicted frequency range may also be calculated as shown in Table 1.

TABLE 1 computation sheet about intermodulation interference and second harmonic interference for LTE system and 5G NR system in a DC mode

| | NR uplink frequency f1 (MHz) | LTE uplink frequency f2 (MHz) | Frequency of second harmonic interference: 2 * f2 (MHz) | Frequency of $2^{nd}$-order intermodulation reference (IMD2): f1-f2 (MHz) |
| --- | --- | --- | --- | --- |
| Frequency range | 3400-3600 | 1710-1785 | 3420-3570 | 1615-1890 |

Figure 4:
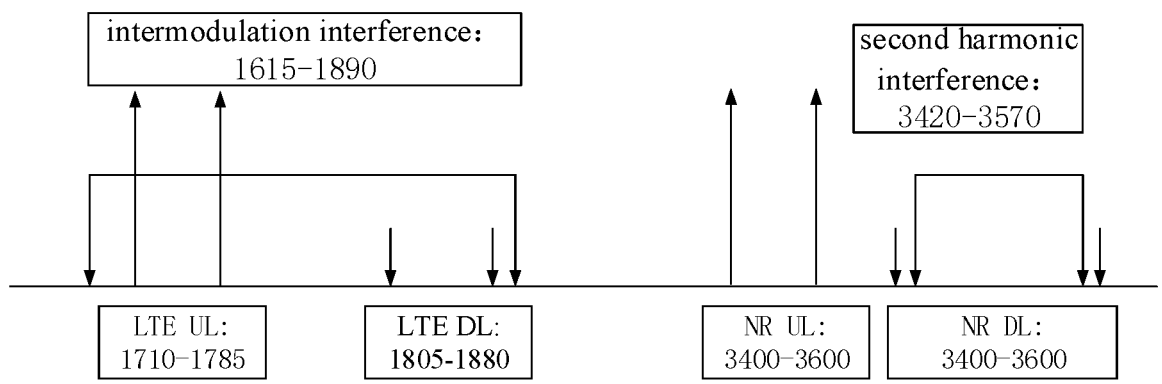
FIG. 4 is a schematic view showing a frequency range according to one embodiment of the present disclosure.

In this way, as shown in FIG. 4, when the LTE uplink frequency range is 1710 MHz to 1785 MHz and the 5G NR uplink frequency range is 3400 MHz to 3600 MHz, the predicted frequency range of the intermodulation interference from the LTE system may be 1615 MHz to 1890 MHz, and when the LTE uplink frequency range is 1710 MHz to 1785 MHz, the predicted frequency range of the second harmonic interference from the 5G NR system may be 3420 MHz to 3570 MHz.

Step 302: receiving intra-UE interference suppression capability information with respect to the intra-UE interference from the UE.

In a possible embodiment of the present disclosure, the receiving the intra-UE interference suppression capability information with respect to the intra-UE interference from the UE includes receiving the intra-UE interference suppression capability information with respect to the intra-UE interference reported by the UE on its own initiative.

During the implementation, the UE may report the intra-UE interference suppression capability information on its own initiative to a network side device, so as to reduce the overhead for signaling transmission. In addition, the UE may determine that there is an intra-UE interference scenario after the UE has a preliminary network search and acquired network frequency configuration information through system broadcasting, and then report the intra-UE interference suppression capability information on its own initiative.

In a possible embodiment of the present disclosure, prior to receiving the intra-UE interference suppression capability information from the UE, the capability information reporting method may further include transmitting an inquiry message about the intra-UE interference suppression capability information to the UE.

In this step, after the predicted frequency range has been determined in Step 301, the network side device may determine that there is the intra-UE interference scenario for the UE, and transmit the inquiry message about the intra-UE interference suppression capability information to the UE. Upon the reception of the inquiry message, the UE may transmit the intra-UE interference suppression capability information to the network side device.

In a possible embodiment of the present disclosure, the intra-UE interference may include: a harmonic interference caused by an uplink signal transmitted by the UE in a first system on a downlink signal received by the UE in a second system, or an intermodulation interference caused by the uplink signal transmitted by the UE in the first system and an uplink signal transmitted by the UE in a second system on a downlink signal received by the UE in the first system.

Figure 5:
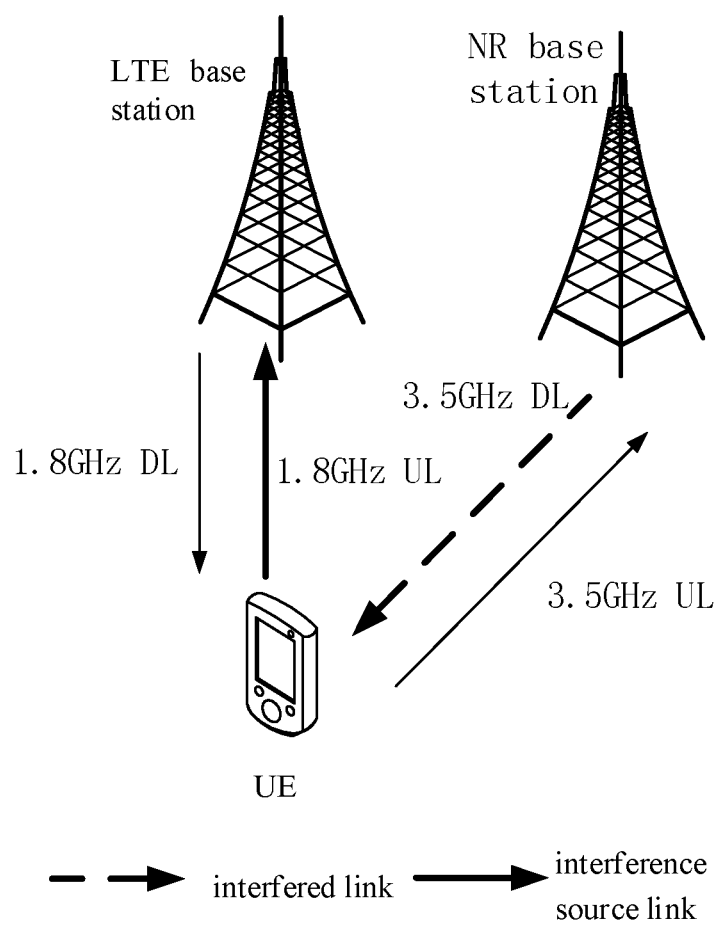
FIG. 5 is a schematic view showing data transmission according to one embodiment of the present disclosure.

During the implementation, it is able to perform an interference avoiding operation on the harmonic interference, so as to reduce or eliminate the interference. For example, when the first system is an LTE system, the second system is a 5G NR system and the UE is connected to the LTE system and the 5G NR system in a DC mode using an LTE Frequency Division Duplexing (FDD) spectrum of 1.8 GHz and an NR Time Division Duplexing (TDD) spectrum of 3.5 GHz, as shown in FIG. 5, the UE may communicate with an LTE base station and an NR base station. To be specific, the UE may transmit an uplink signal to the LTE base station at the spectrum of 1.8 GHz, and receive a downlink signal from the NR base station at the spectrum of 3.5 GHz. At this time, the intra-UE interference may be caused by the uplink signal on the downlink signal, i.e., the uplink signal may be an interference source link, and the downlink signal may be an interfered link. In a possible embodiment of the present disclosure, the harmonic interference may be a second harmonic interference or any other harmonic interference.

Figure 6:
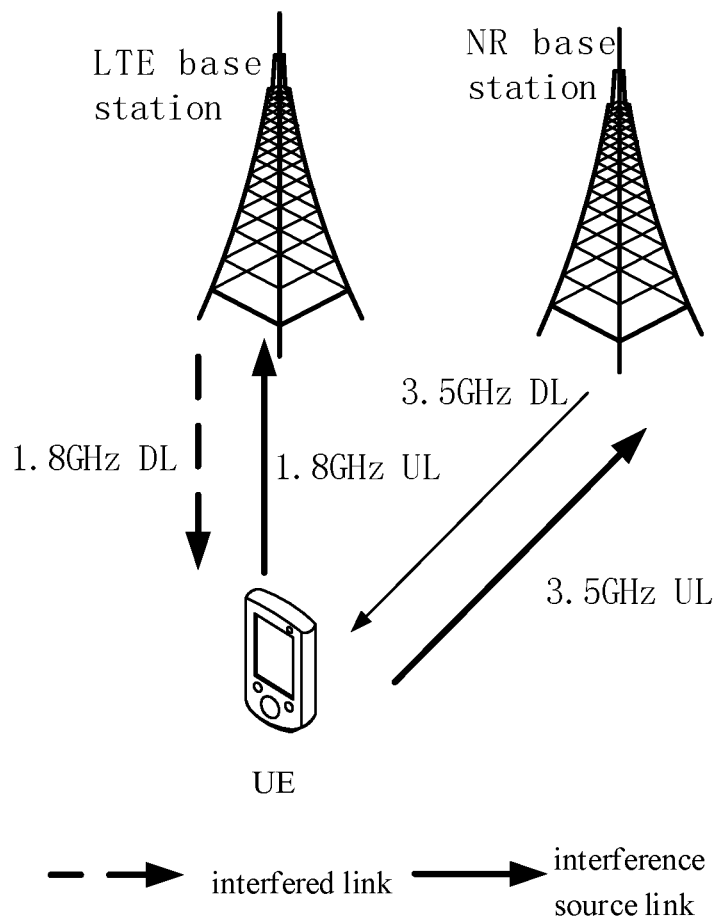
FIG. 6 is another schematic view showing data transmission according to one embodiment of the present disclosure.

During the implementation, it is able to perform an interference avoiding operation on the intermodulation interference, so as to reduce or eliminate the interference. For example, when the first system is the LTE system, the second system is the 5G NR system and the UE is connected to the LTE system and the 5G NR system in a DC mode using an LTE FDD spectrum of 1.8 GHz and an NR TDD spectrum of 3.5 GHz, as shown in FIG. 6, the UE may communicate with the LTE base station and the NR base station. To be specific, the UE may transmit an uplink signal to the LTE base station at the spectrum of 1.8 GHz, and simultaneously transmit an uplink signal to the NR base station at the spectrum of 3.5 GHz and receive a downlink signal from the LTE base station at the spectrum of 1.8 GHz. At this time, the intra-UE interference may be caused by the two uplink signals on the downlink signal, i.e., the two uplink signals may each be an interference source link, and the downlink signal may be an interfered link.

In addition, the intermodulation interference may be a $2^{nd}$-order intermodulation interference (IMD2) or any other high-order intermodulation interference. For example, the intermodulation interference caused when signals are transmitted by the UE at Band 3 of 1.8 GHz and 3.5 GHz may include the $2^{nd}$-order intermodulation interference and the other high-order intermodulation interference. The other high-order intermodulation interference, e.g., a $3^{rd}$-order intermodulation interference (IMD3) may lead to an intermodulation product at a near zero frequency on the basis of a mathematical relationship, and this product may probably occur at an output of a Low Noise Amplifier (LNA) of an LTE receiver. When a mixer cascaded to the LNA has limited isolation at the near zero frequency, the product may be directly leaked to an output end of the mixer, and at this time the reception performance may be further adversely affected.

During the implementation, when the intra-UE interference includes the harmonic interference, the intra-UE interference suppression capability information may include a harmonic interference isolation performance, indication information indicating whether the intra-UE interference suppression capability information of the UE meets a predetermined requirement on an intra-UE interference suppression capability index, receiving signal sensitivity information about the UE, or indication information indicating receiving signal sensitivity degradation of the UE.

The harmonic interference isolation performance may be a specific isolation value, e.g., the isolation performance capability of the UE with respective to the second harmonic interference at a frequency of 1.8 GHz may be 65 dB. In this way, it is able to accurately notify the network side device of the isolation of the UE, thereby to enable the network side device to perform the interference avoiding operation in an accurate manner. The indication information may include one bit. For example, the UE may report, through one bit, whether the UE meets the requirement on the isolation performance for the second harmonic interference defined by a third-party organization (e.g., 3GPP RAN4), e.g., 1 represents that the UE meets the defined isolation performance (i.e., 60 dB) for the second harmonic interference, and 0 represents that the UE does not meet the defined isolation performance. In this way, it is able to indicate the intra-UE interference suppression capability information about the UE merely through the indication information, e.g., through one bit, thereby to reduce the signaling overhead. The receiving signal sensitivity information may be used to indicate sensitivity when a signal is received by the UE influenced by the intra-UE interference. The receiving signal sensitivity degradation may refer to a degradation value of the sensitivity when a signal is received by the UE influenced by the intra-UE interference. For example, the sensitivity when a signal received by the UE is in a normal case (i.e., without any intra-UE interference) may be −85 dBm. When there is the intra-UE interference, the signal may be received successfully at a larger reception signal level, e.g., −80 dBm. At this time, the receiving signal sensitivity degradation may be −80−(−85)=5 dB (a relative value). In other words, the receiving signal sensitivity information may refer to the receiving signal sensitivity (e.g., −80 dBm) of the UE influenced by the intra-UE interference, and the receiving signal sensitivity degradation may refer to the degradation value (e.g., 5 dB) of the receiving signal sensitivity of the UE influenced by the intra-UE interference.

Alternatively, when the intra-UE interference includes the intermodulation interference, the intra-UE interference suppression capability information may include an intermodulation interference isolation performance, indication information indicating whether the intra-UE interference suppression capability information of the UE meets a predetermined requirement on an intra-UE interference suppression capability index, receiving signal sensitivity information about the UE, or indication information indicating receiving signal sensitivity degradation of the UE, or an isolation performance of the UE with respect to at least one power difference. The power difference may refer to an absolute difference between transmission power of the first system and transmission power of the second system when uplink signals are transmitted by the UE in the first system and the second system simultaneously.

The intermodulation interference isolation performance may be a specific isolation value, e.g., the intermodulation interference isolation performance when the uplink signals are transmitted simultaneously at a frequency of 1.8 GHz and a frequency of 3.5 GHz may be 65 dB. In this way, it is able to accurately notify the network side device of the isolation of the UE, thereby to enable the network side device to perform the interference avoiding operation in an accurate manner. The indication information may include one bit. For example, the UE may report, through one bit, whether the UE meets the requirement on the isolation performance for the second harmonic interference defined by a third-party organization (e.g., 3GPP RAN4), e.g., 1 represents that the UE meets the defined isolation performance (i.e., 60 dB) for the second harmonic interference, and 0 represents that the UE does not meet the defined isolation performance. In this way, it is able to indicate the intra-UE interference suppression capability information about the UE merely through the indication information, e.g., through one bit, thereby to reduce the signaling overhead.

The at least one power difference may be used to indicate power differences of the UE at different time, and any power difference may be used to indicate an absolute difference between the transmission power of the first system and the transmission power of the second system when the uplink signals are transmitted by the UE in the first system and the second system at a corresponding time. The isolation performance with respect to at least one power difference may be an isolation performance related to the transmission power for the UE at two frequency points. For example, as shown in Table 2, Pa represents transmission power of the UE at a frequency point F1 at which the intermodulation interference is generated, Pb represents transmission power of the UE at a frequency point F2 at which the intermodulation interference is generated, Pc represents a value of the intermodulation interference generated when the uplink signals are transmitted by the UE at the frequency points F1 and F2 simultaneously, and min{Pa, Pb} represents a minimum one of Pa and Pb. For example, when Pa is 60 dBm, Pb is 62 dBm, and Pc is 30 dB, the isolation performance with respect to the power difference maybe 30 dB.

TABLE 2

| |Pa-Pb| (dBm) | 2 | 5 | 8 | ... |
|---|---|---|---|---|
| Pc-min{Pa, Pb} (dB) | −30 | −20 | −10 | ... |

Although negative values are shown in Table 2, in actual use, absolute values may be adopted for the corresponding calculation or determination, which will not be particularly defined herein.

Step 303: performing the interference avoiding operation in accordance with the intra-UE interference suppression capability information.

Step 303 may be optional, i.e., it may not be performed, or the interference avoiding operation may be performed within the predicted frequency range in accordance with the intra-UE interference suppression capability information when the intra-UE interference suppression capability information meets a predetermined condition or the network side device meets a predetermined condition. When the intra-UE interference suppression capability information meets the predetermined condition, the intra-UE interference suppression capability may be smaller than a predetermined threshold or may not meet a predetermined intra-UE interference suppression capability index requirement.

In addition, the preforming the interference avoiding operation in accordance with the intra-UE interference suppression capability information may include acquiring the interference avoiding operation corresponding to the isolation performance capability information in accordance with a pre-acquired mapping relationship or selection policy, and performing the interference avoiding operation. The interference avoiding operation may be an operation for reducing, preventing or eliminating the influence caused by the intra-UE interference. For example, the value of the interference may be reduced or eliminated through selecting a transmission mode, performing an avoidance scheduling operation, reducing a downlink Modulation and Coding Scheme (MCS), increasing downlink transmission power and reducing uplink transmission power, so as to reduce or eliminate the influence caused by the intra-UE interference. In a possible embodiment of the present disclosure, the preforming the interference avoiding operation in accordance with the intra-UE interference suppression capability information may include performing the interference avoiding operation within the predicted frequency range in accordance with the intra-UE interference suppression capability information.

In a possible embodiment of the present disclosure, the interference avoiding operation may include one or more of selecting a transmission mode, performing an avoidance scheduling operation, reducing a downlink MCS, increasing downlink transmission power and reducing uplink transmission power.

For example, the performing the interference avoiding operation in accordance with the intra-UE interference suppression capability information may include: when the intra-UE interference includes the harmonic interference and a difference acquired by subtracting the receiving signal sensitivity of the UE from downlink reception power of the UE in the second system is greater than a predetermined threshold, scheduling the UE to perform uplink transmission in the first system, and when the difference acquired by subtracting the receiving signal sensitivity of the UE from the downlink reception power of the UE in the second system is not greater than the predetermined threshold, not scheduling the UE to perform the uplink transmission in the first system; or when the intra-UE interference includes the intermodulation interference and a difference acquired by subtracting the receiving signal sensitivity of the UE from downlink reception power of the UE in the first system is greater than a predetermined threshold, scheduling the UE to perform the uplink transmission in the first system and perform uplink transmission in the second system, and when the difference acquired by subtracting the receiving signal sensitivity of the UE from the downlink reception power of the UE in the first system is not greater than the predetermined threshold, not scheduling the UE to perform the uplink transmission in the first system and perform the uplink transmission in the second system simultaneously.

In addition, when the network side device determines that a value of (the transmission power of the UE minus the isolation value minus the downlink reception power) is greater than a threshold, the network side device may not schedule the uplink transmission, and when the value is not greater than the threshold, the network side device may schedule the uplink transmission (at this time, the MCS at a low level may be adopted to improve the reliability).

The transmission power may be one of, e.g., a smaller one or a bigger one of, the transmission power of the UE in the first system and the transmission power of the UE in the second system. For example, with respect to the intermodulation interference, when a base station determines that the value of (the transmission power of the UE minus the isolation minus the downlink reception power) is greater than the threshold, the base station may not schedule the uplink transmission, and when the value is not greater than the threshold, the base station may schedule the uplink transmission (at this time, the MCS at a low level may be adopted to improve the reliability).

In addition, when scheduling the uplink transmission for the UE, an MCS at a level lower than a specific MCS may be adopted to transmit a downlink signal to the UE. The specific MCS may be an MCS currently adopted by the network side device, or a preset MCS. Through transmitting the downlink signal to the UE within the predicted frequency range using the MCS at a level lower than the specific MCS, i.e., through transmitting the downlink signal at a lower level, it is able to improve the reliability and reduce the influence caused by the intra-UE interference.

Of course, the transmitting the downlink signal using the MCS at a low level or not scheduling the uplink transmission is merely an example of the interference avoiding operation. The interference avoiding operation may also include selecting a transmission mode with a high anti-interference level for the uplink transmission, increasing the downlink transmission power, or reducing the uplink transmission power when the isolation performance indicated in the intra-UE interference suppression capability information is smaller than a threshold, e.g., 30 dB. In a possible embodiment of the present disclosure, the interference avoiding operation, e.g., selecting the transmission mode, increasing the downlink transmission power or reducing the uplink transmission power, may be performed in accordance with a pre-acquired mapping relationship between isolation performance value and transmission modes, a mapping relationship between the isolation indices and the downlink transmission power, or a mapping relationship between the isolation indices and the uplink transmission power. Alternatively, the interference avoiding operation, e.g., selecting the transmission mode, increasing the downlink transmission power or reducing the uplink transmission power, may be performed in accordance with a pre-acquired mapping relationship between the receiving signal sensitivity and the transmission modes, a mapping relationship between the receiving signal sensitivity and the downlink transmission power, or a mapping relationship between the receiving signal sensitivity and the uplink transmission power.

The network side device may transmit a message to the UE so as to indicate the UE to reduce the uplink transmission power, may select the transmission mode or notify the UE or another network side device to select the transmission mode, and may reduce the downlink transmission power or the MCS or notify another network side device to reduce the downlink transmission power or the MCS, which will not be particularly defined herein.

According to the embodiments of the present disclosure, various optional implementation modes may be provided on the basis of the capability information reporting method in FIG. 2, so as to reduce the interference caused by the intra-UE interference.

Figure 7:
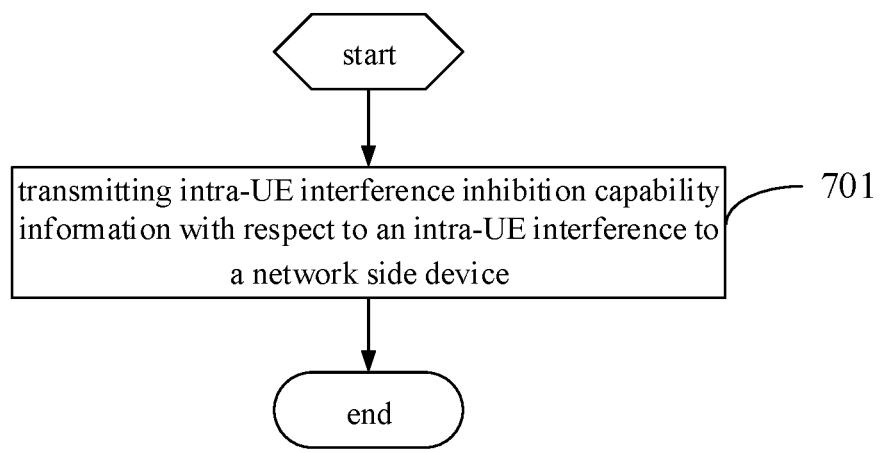
FIG. 7 is a flow chart of a capability information reporting method according to one embodiment of the present disclosure.

The present disclosure further provides in some embodiments a capability information reporting method which, as shown in FIG. 7, includes Step 701 of transmitting intra-UE interference suppression capability information with respect to an intra-UE interference to a network side device. The intra-UE interference suppression capability information may include intra-UE interference suppression capability information about the UE within a predicted frequency range, and the predicted frequency range may be a predicted frequency range of the intra-UE interference.

The predicted frequency range may be acquired by the UE, or received from the network side device, which will not be particularly defined herein.

In a possible embodiment of the present disclosure, the predicted frequency range may include: a frequency range located within a first candidate predicted frequency range and belonging to a downlink system bandwidth of a second system for the UE, the first candidate predicted frequency range being a candidate predicted frequency range of the intra-UE interference within an uplink operating frequency range of a first system for the UE; or a frequency range located within a second candidate predicted frequency range and belonging to a downlink system bandwidth of the first system for the UE, the second candidate predicted frequency range being a candidate predicted frequency range of the intra-UE interference within the uplink operating frequency range of the first system for the UE and an uplink operating frequency range of the second system for the UE.

In a possible embodiment of the present disclosure, the intra-UE interference may include: a harmonic interference caused by an uplink signal transmitted by the UE in the first system on a downlink signal received by the UE in the second system; or an intermodulation interference caused by the uplink signal transmitted by the UE in the first system and an uplink signal transmitted by the UE in the second system on a downlink signal received by the UE in the first system.

In a possible embodiment of the present disclosure, when the intra-UE interference includes the harmonic interference, the intra-UE interference suppression capability information may include a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference includes the intermodulation interference, the intra-UE interference suppression capability information may include an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference. The power difference may be an absolute difference between transmission power of the first system and transmission power of the second system when uplink signals are transmitted by the UE in the first system and the second system simultaneously.

In a possible embodiment of the present disclosure, prior to transmitting the intra-UE interference suppression capability information with respect to the intra-UE interference to the network side device, the capability information reporting method may further include receiving an inquiry message about the intra-UE interference suppression capability from the network side device.

In a possible embodiment of the present disclosure, the transmitting the intra-UE interference suppression capability information with respect to the intra-UE interference to the network side device may include determining whether the UE is in an intra-UE interference scenario in accordance with acquired network frequency configuration information, and when the UE is in the intra-UE interference scenario, transmitting, by the UE, the intra-UE interference suppression capability information with respect to the intra-UE interference to the network side device on its own initiative.

In a possible embodiment of the present disclosure, the intra-UE interference suppression capability information may include pre-detected and pre-stored intra-UE interference suppression capability information about the UE within the predicted frequency range.

In a possible embodiment of the present disclosure, the intra-UE interference suppression capability information may be used for the network side device to perform an interference avoiding operation within the predicted frequency range in accordance with the intra-UE interference suppression capability information.

In a possible embodiment of the present disclosure, the interference avoiding operation may include one or more of selecting a transmission mode, performing an avoidance scheduling operation, reducing an MCS, increasing downlink transmission power, and decreasing uplink transmission power.

In a possible embodiment of the present disclosure, subsequent to transmitting the intra-UE interference suppression capability information with respect to the intra-UE interference to the network side device, the capability information reporting method may further include: when the intra-UE interference includes the harmonic interference and a difference acquired by subtracting the receiving signal sensitivity of the UE from downlink reception power of the UE in the second system is greater than a predetermined threshold, performing uplink transmission in the first system in accordance with an uplink scheduling instruction from the network side device, and when the difference acquired by subtracting the receiving signal sensitivity of the UE from the downlink reception power of the UE in the second system is not greater than the predetermined threshold, not performing the uplink transmission in the first system; or when the intra-UE interference includes the intermodulation interference and a difference acquired by subtracting the receiving signal sensitivity of the UE from downlink reception power of the UE in the first system is greater than a predetermined threshold, performing the uplink transmission in the first system and performing uplink transmission in the second system in accordance with an uplink scheduling instruction from the network side device, and when the difference acquired by subtracting the receiving signal sensitivity of the UE from the downlink reception power of the UE in the first system is not greater than the predetermined threshold, not performing the uplink transmission in the first system and the uplink transmission in the second system simultaneously.

It should be appreciated that, the implementation of the capability information reporting method may refer to the relevant description about the UE in the capability information reporting method in FIGS. 2-3 with a same beneficial effect, which will not be particularly defined herein.

Figure 8:
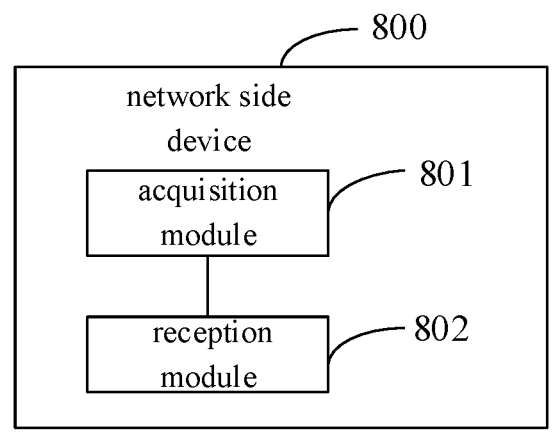
FIG. 8 is a schematic view showing a network side device according to one embodiment of the present disclosure.

The present disclosure further provides in some embodiments a network side device capable of implementing the above-mentioned capability information reporting method in FIGS. 2-3 with a same beneficial effect. As shown in FIG. 8, the network side device 800 may include: an acquisition module 801 configured to acquire a predicted frequency range of an intra-UE interference; and a reception module 802 configured to receive intra-UE interference suppression capability information with respect to the intra-UE interference from the UE. The intra-UE interference suppression capability information may include intra-UE interference suppression capability information about the UE within the predicted frequency range.

In a possible embodiment of the present disclosure, the acquisition module 801 is further configured to: calculate a first candidate predicted frequency range of the intra-UE interference within an uplink operating frequency range of a first system, and take a first target frequency range within the first candidate predicted frequency range as the predicted frequency range, the first target frequency range being a frequency range located within the first candidate predicted frequency range and belonging to a downlink system bandwidth of a second system for the UE; or calculate a second candidate predicted frequency range of the intra-UE interference within the uplink operating frequency range of the first system and an uplink operating frequency range of the second system, and take a second target frequency range within the second candidate predicted frequency range as the predicted frequency range, the second target frequency range being a frequency range located within the second candidate predicted frequency range and belonging to a downlink system bandwidth of the first system for the UE.

In a possible embodiment of the present disclosure, the intra-UE interference may include: a harmonic interference caused by an uplink signal transmitted by the UE in the first system on a downlink signal received by the UE in the second system; or an intermodulation interference caused by the uplink signal transmitted by the UE in the first system and an uplink signal transmitted by the UE in the second system on a downlink signal received by the UE in the first system.

In a possible embodiment of the present disclosure, when the intra-UE interference includes the harmonic interference, the intra-UE interference suppression capability information may include a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference includes the intermodulation interference, the intra-UE interference suppression capability information may include an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference. The power difference may be an absolute difference between transmission power of the first system and transmission power of the second system when uplink signals are transmitted by the UE in the first system and the second system simultaneously.

Figure 9:
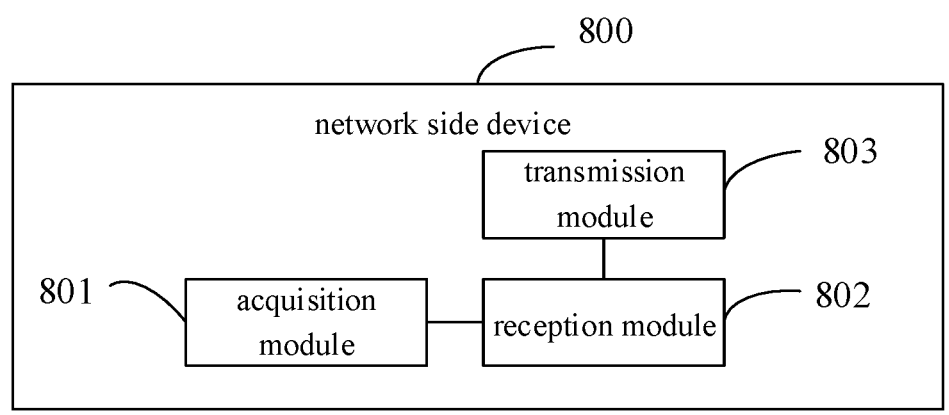
FIG. 9 is another schematic view showing the network side device according to one embodiment of the present disclosure.

In a possible embodiment of the present disclosure, as shown in FIG. 9, the network side device 800 may further include a transmission module 803 configured to transmit an inquiry message about the intra-UE interference suppression capability to the UE.

In a possible embodiment of the present disclosure, the reception module 802 is further configured to receive the intra-UE interference suppression capability information with respect to the intra-UE interference reported by the UE on its own initiative.

In a possible embodiment of the present disclosure, the intra-UE interference suppression capability information may include intra-UE interference suppression capability information about the UE within the predicted frequency range.

Figure 10:
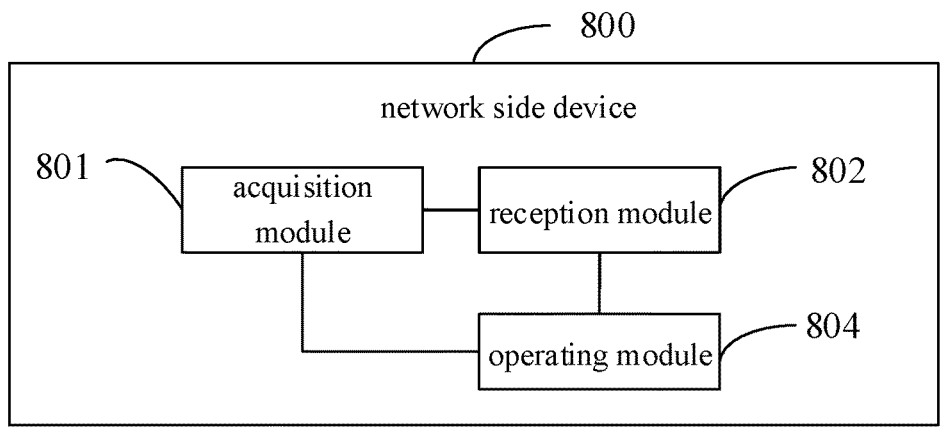
FIG. 10 is yet another schematic view showing the network side device according to one embodiment of the present disclosure.

In a possible embodiment of the present disclosure, as shown in FIG. 10, the network side device 800 may further include an operating module 804 configured to perform an interference avoiding operation in accordance with the intra-UE interference suppression capability information.

In a possible embodiment of the present disclosure, the interference avoiding operation may include one or more of selecting a transmission mode, performing an avoidance scheduling operation, reducing an MCS, increasing downlink transmission power, and decreasing uplink transmission power.

In a possible embodiment of the present disclosure, the operating module 804 is further configured to: when the intra-UE interference includes the harmonic interference and a difference acquired by subtracting the receiving signal sensitivity of the UE from downlink reception power of the UE in the second system is greater than a predetermined threshold, schedule the UE to perform uplink transmission in the first system, and when the difference acquired by subtracting the receiving signal sensitivity of the UE from the downlink reception power of the UE in the second system is not greater than the predetermined threshold, not schedule the UE to perform the uplink transmission in the first system; or when the intra-UE interference includes the intermodulation interference and a difference acquired by subtracting the receiving signal sensitivity of the UE from downlink reception power of the UE in the first system is greater than a predetermined threshold, schedule the UE to perform the uplink transmission in the first system and perform uplink transmission in the second system, and when the difference acquired by subtracting the receiving signal sensitivity of the UE from the downlink reception power of the UE in the first system is not greater than the predetermined threshold, not schedule the UE to perform the uplink transmission in the first system and perform the uplink transmission in the second system simultaneously.

It should be appreciated that, the implementation of the network side device 800 may refer to the relevant description in the above-mentioned capability information reporting method with a same beneficial effect, and thus will not be particularly defined herein.

Figure 11:
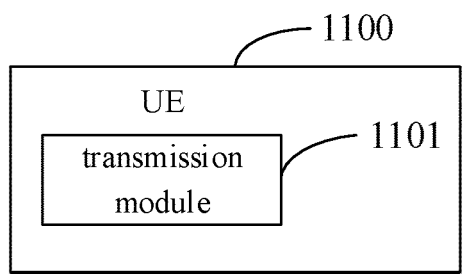
FIG. 11 is a schematic view showing a UE according to one embodiment of the present disclosure.

The present disclosure further provides in some embodiments a UE capable of implementing the capability information reporting method in FIG. 7 with a same beneficial effect. As shown in FIG. 11, the UE 1100 may include a transmission module 1101 configured to transmit intra-UE interference suppression capability information with respect to an intra-UE interference to a network side device. The intra-UE interference suppression capability information may include intra-UE interference suppression capability information about the UE within a predicted frequency range, and the predicted frequency range may be a predicted frequency range of the intra-UE interference.

In a possible embodiment of the present disclosure, the predicted frequency range may include: a frequency range located within a first candidate predicted frequency range and belonging to a downlink system bandwidth of a second system for the UE, the first candidate predicted frequency range being a candidate predicted frequency range of the intra-UE interference within an uplink operating frequency range of a first system for the UE; or a frequency range located within a second candidate predicted frequency range and belonging to a downlink system bandwidth of the first system for the UE, the second candidate predicted frequency range being a candidate predicted frequency range of the intra-UE interference within the uplink operating frequency range of the first system for the UE and an uplink operating frequency range of the second system for the UE.

In a possible embodiment of the present disclosure, the intra-UE interference may include: a harmonic interference caused by an uplink signal transmitted by the UE in the first system on a downlink signal received by the UE in the second system; or an intermodulation interference caused by the uplink signal transmitted by the UE in the first system and an uplink signal transmitted by the UE in the second system on a downlink signal received by the UE in the first system.

In a possible embodiment of the present disclosure, when the intra-UE interference includes the harmonic interference, the intra-UE interference suppression capability information may include a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference includes the intermodulation interference, the intra-UE interference suppression capability information may include an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference. The power difference may be an absolute difference between transmission power of the first system and transmission power of the second system when uplink signals are transmitted by the UE in the first system and the second system simultaneously.

Figure 12:
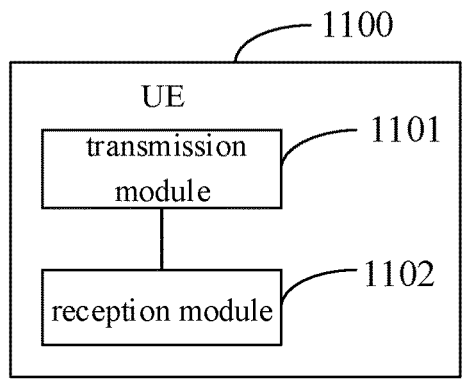
FIG. 12 is another schematic view showing the UE according to one embodiment of the present disclosure.

In a possible embodiment of the present disclosure, as shown in FIG. 12, the UE 1100 may further include a reception module 1102 configured to receive an inquiry message about the intra-UE interference suppression capability from the network side device.

In a possible embodiment of the present disclosure, the transmission module 1101 is further configured to determine whether the UE is in an intra-UE interference scenario in accordance with acquired network frequency configuration information, and when the UE is in the intra-UE interference scenario, transmit the intra-UE interference suppression capability information with respect to the intra-UE interference to the network side device on its own initiative.

In a possible embodiment of the present disclosure, the intra-UE interference suppression capability information may include pre-detected and pre-stored intra-UE interference suppression capability information about the UE within the predicted frequency range.

In a possible embodiment of the present disclosure, the intra-UE interference suppression capability information may be used for the network side device to perform an interference avoiding operation within the predicted frequency range in accordance with the intra-UE interference suppression capability information.

In a possible embodiment of the present disclosure, the interference avoiding operation may include one or more of selecting a transmission mode, performing an avoidance scheduling operation, reducing an MCS, increasing downlink transmission power, and decreasing uplink transmission power.

Figure 13:
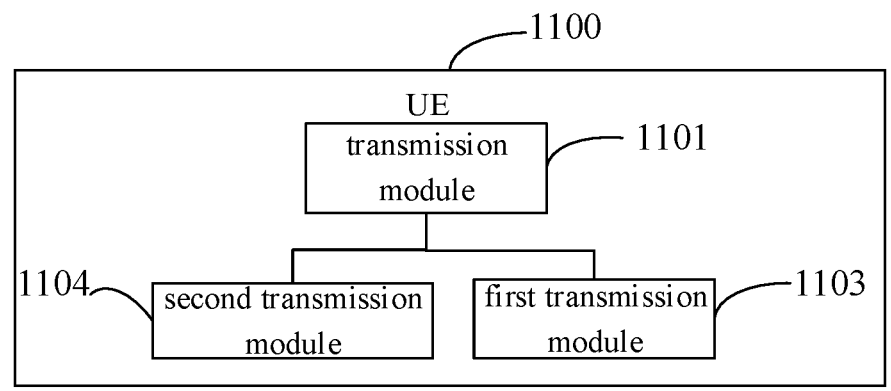
FIG. 13 is yet another schematic view showing the UE according to one embodiment of the present disclosure.

In a possible embodiment of the present disclosure, as shown in FIG. 13, the UE 1100 may further include: a first transmission module 1103 configured to, when the intra-UE interference includes the harmonic interference and a difference acquired by subtracting the receiving signal sensitivity of the UE from downlink reception power of the UE in the second system is greater than a predetermined threshold, perform uplink transmission in the first system in accordance with an uplink scheduling instruction from the network side device, and when the difference acquired by subtracting the receiving signal sensitivity of the UE from the downlink reception power of the UE in the second system is not greater than the predetermined threshold, not perform the uplink transmission in the first system; or a second transmission module 1104 configured to, when the intra-UE interference includes the intermodulation interference and a difference acquired by subtracting the receiving signal sensitivity of the UE from downlink reception power of the UE in the first system is greater than a predetermined threshold, perform the uplink transmission in the first system and perform uplink transmission in the second system in accordance with an uplink scheduling instruction from the network side device, and when the difference acquired by subtracting the receiving signal sensitivity of the UE from the downlink reception power of the UE in the first system is not greater than the predetermined threshold, not perform the uplink transmission in the first system and the uplink transmission in the second system simultaneously.

It should be appreciated that, the implementation of the UE 1100 may refer to the relevant description in the capability information reporting method with a same beneficial effect, and thus will not be particularly defined herein.

Figure 14:
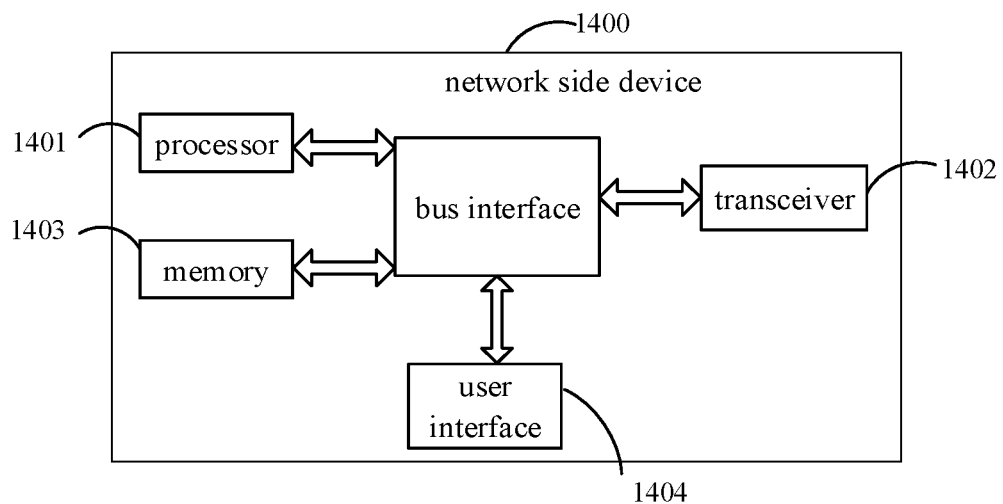
FIG. 14 is still yet another schematic view showing the network side device according to one embodiment of the present disclosure.

The present disclosure further provides in some embodiments a network side device capable of implementing the capability information reporting method in FIGS. 2-3 with a same beneficial effect. As shown in FIG. 14, the network side device 1400 may include a processor 1401, a transceiver 1402, a memory 1403, a user interface 1404 and a bus system. The processor 1401 is configured to read a program stored in the memory 1403, so as to: acquire a predicted frequency range of an intra-UE interference; and receive intra-UE interference suppression capability information with respect to the intra-UE interference from the UE. The intra-UE interference suppression capability information may include intra-UE interference suppression capability information about the UE within the predicted frequency range. The transceiver 1402 is configured to receive and transmit data under the control of the processor 1401.

In FIG. 14, bus architecture may include a number of buses and bridges connected to each other, so as to connect various circuits for one or more processors 1401 and one or more memories 1403. In addition, as is known in the art, the bus architecture may be used to connect any other circuits, such as a circuit for a peripheral device, a circuit for a voltage stabilizer and a power management circuit. A bus interface may be provided, and the transceiver 1402 may consist of a plurality of elements, i.e., a transmitter and a receiver for communication with any other devices over a transmission medium. With respect to different UEs, the user interface 1404 may also be provided for devices which are to be arranged inside or outside the UE, and these devices may include but not limited to a keypad, a display, a speaker, a microphone and a joystick. The processor 1401 may take charge of managing the bus architecture as well as general processings. The memory 1403 may store therein data for the operation of the processor 1401.

In a possible embodiment of the present disclosure, when acquiring the predicted frequency range of the intra-UE interference, the processor 1401 is further configured to: calculate a first candidate predicted frequency range of the intra-UE interference within an uplink operating frequency range of a first system, and take a first target frequency range within the first candidate predicted frequency range as the predicted frequency range, the first target frequency range being a frequency range located within the first candidate predicted frequency range and belonging to a downlink system bandwidth of a second system for the UE; or calculate a second candidate predicted frequency range of the intra-UE interference within the uplink operating frequency range of the first system and an uplink operating frequency range of the second system, and take a second target frequency range within the second candidate predicted frequency range as the predicted frequency range, the second target frequency range being a frequency range located within the second candidate predicted frequency range and belonging to a downlink system bandwidth of the first system for the UE.

In a possible embodiment of the present disclosure, the intra-UE interference may include: a harmonic interference caused by an uplink signal transmitted by the UE in the first system on a downlink signal received by the UE in the second system; or an intermodulation interference caused by the uplink signal transmitted by the UE in the first system and an uplink signal transmitted by the UE in the second system on a downlink signal received by the UE in the first system.

In a possible embodiment of the present disclosure, when the intra-UE interference includes the harmonic interference, the intra-UE interference suppression capability information may include a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference includes the intermodulation interference, the intra-UE interference suppression capability information may include an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference. The power difference may be an absolute difference between transmission power of the first system and transmission power of the second system when uplink signals are transmitted by the UE in the first system and the second system simultaneously.

In a possible embodiment of the present disclosure, prior to receiving the intra-UE interference suppression capability information from the UE, the processor 1401 is further configured to transmit an inquiry message about the intra-UE interference suppression capability to the UE.

In a possible embodiment of the present disclosure, when receiving the intra-UE interference suppression capability information with respect to the intra-UE interference from the UE, the processor 1401 is further configured to receive the intra-UE interference suppression capability information with respect to the intra-UE interference reported by the UE on its own initiative.

In a possible embodiment of the present disclosure, the intra-UE interference suppression capability information may include intra-UE interference suppression capability information about the UE within the predicted frequency range.

In a possible embodiment of the present disclosure, subsequent to receiving the intra-UE interference suppression capability information from the UE, the processor 1401 is further configured to perform an interference avoiding operation in accordance with the intra-UE interference suppression capability information.

In a possible embodiment of the present disclosure, the interference avoiding operation may include one or more of selecting a transmission mode, performing an avoidance scheduling operation, reducing an MCS, increasing downlink transmission power, and decreasing uplink transmission power.

In a possible embodiment of the present disclosure, when performing the interference avoiding operation in accordance with the intra-UE interference suppression capability information, the processor 1401 is further configured to: when the intra-UE interference includes the harmonic interference and a difference acquired by subtracting the receiving signal sensitivity of the UE from downlink reception power of the UE in the second system is greater than a predetermined threshold, schedule the UE to perform uplink transmission in the first system, and when the difference acquired by subtracting the receiving signal sensitivity of the UE from the downlink reception power of the UE in the second system is not greater than the predetermined threshold, not schedule the UE to perform the uplink transmission in the first system; or when the intra-UE interference includes the intermodulation interference and a difference acquired by subtracting the receiving signal sensitivity of the UE from downlink reception power of the UE in the first system is greater than a predetermined threshold, schedule the UE to perform the uplink transmission in the first system and perform uplink transmission in the second system, and when the difference acquired by subtracting the receiving signal sensitivity of the UE from the downlink reception power of the UE in the first system is not greater than the predetermined threshold, not schedule the UE to perform the uplink transmission in the first system and perform the uplink transmission in the second system simultaneously.

It should be appreciated that, the implementation of the network side device 1400 may refer to the relevant description in the above-mentioned capability information reporting method with a same beneficial effect, and thus will not be particularly defined herein.

Figure 15:
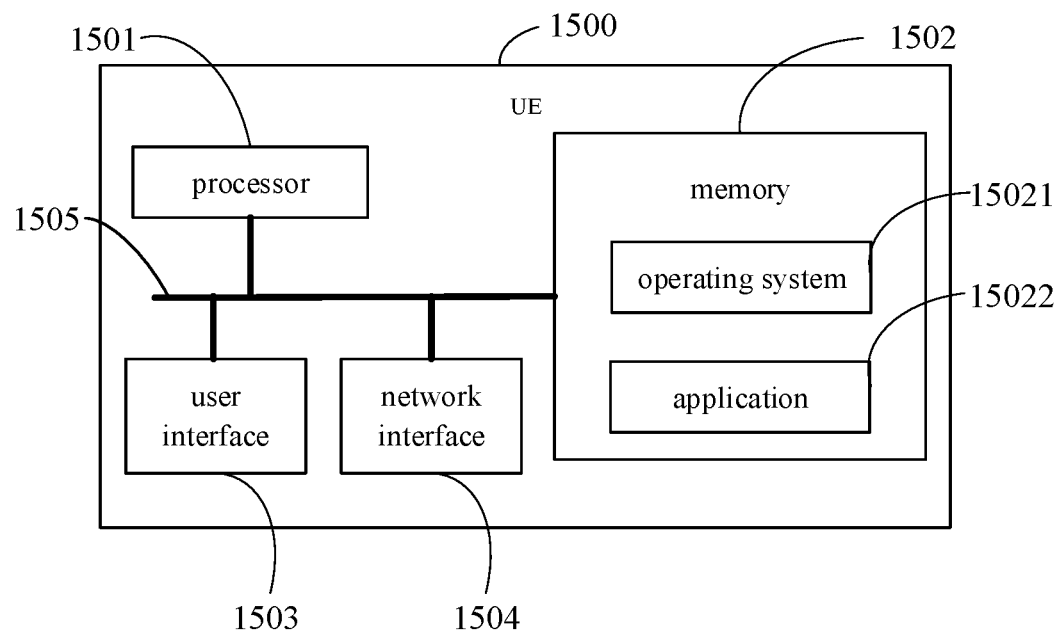
FIG. 15 is still yet another schematic view showing the UE according to one embodiment of the present disclosure.

The present disclosure further provides in some embodiments a UE capable of implementing the capability information reporting method in FIG. 7 with a same beneficial effect. As shown in FIG. 15, the UE 1500 may include at least one processor 1501, a memory 1502, at least one network interface 1504 and a user interface 1503. The components of the UE 1500 may be coupled together through a bus system 1505. It should be appreciated that, the bus system 1505 is configured to achieve connection and communication among the components. Apart from a data bus, the bus system 1505 may further include a power source bus, a control bus and a state signal bus. For clarification, all these buses in FIG. 15 may be collectively called as bus system 1505.

The user interface 1503 may include a display, a keyboard or a pointing device (e.g., mouse, track ball, touch plate or touch panel).

It should be appreciated that, the memory 1502 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAIVI). The memory 1502 intends to include, but not limited to, the above-mentioned and any other appropriate memories.

In a possible embodiment of the present disclosure, the following elements may be stored in the memory 1502: an executable module or data structure, a subset or an extended set thereof, an operating system 15021 and an application 15022.

The operating system 15021 may include various system programs, e.g., a framework layer, a core layer and a driving layer, so as to implement various basic services and process hardware-based tasks. The application 15022 may include various applications, e.g., Media Player and Browser, so as to implement various application services. The programs for implementing the above-mentioned method may be included in the application 15022.

In this embodiment, through calling a program or instruction stored in the memory 1502, e.g., a program or instruction stored in the application 15022, the processor 1501 is configured to transmit intra-UE interference suppression capability information with respect to an intra-UE interference to a network side device. The intra-UE interference suppression capability information may include intra-UE interference suppression capability information about the UE within a predicted frequency range, and the predicted frequency range may be a predicted frequency range of the intra-UE interference.

The above-mentioned method may be applied to, or implemented by, the processor 1501. The processor 1501 may be an integrated circuit (IC) having a signal processing capability. During the implementation, the steps of the above-mentioned method may be completed through an integrated logic circuit of hardware in the processor 1501 or instructions in the form of software. The processor 1501 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1502, and the processor 1501 may read information stored in the memory 1502 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the predicted frequency range may include: a frequency range located within a first candidate predicted frequency range and belonging to a downlink system bandwidth of a second system for the UE, the first candidate predicted frequency range being a candidate predicted frequency range of the intra-UE interference within an uplink operating frequency range of a first system for the UE; or a frequency range located within a second candidate predicted frequency range and belonging to a downlink system bandwidth of the first system for the UE, the second candidate predicted frequency range being a candidate predicted frequency range of the intra-UE interference within the uplink operating frequency range of the first system for the UE and an uplink operating frequency range of the second system for the UE.

In a possible embodiment of the present disclosure, the intra-UE interference may include: a harmonic interference caused by an uplink signal transmitted by the UE in the first system on a downlink signal received by the UE in the second system; or an intermodulation interference caused by the uplink signal transmitted by the UE in the first system and an uplink signal transmitted by the UE in the second system on a downlink signal received by the UE in the first system.

In a possible embodiment of the present disclosure, when the intra-UE interference includes the harmonic interference, the intra-UE interference suppression capability information may include a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference includes the intermodulation interference, the intra-UE interference suppression capability information may include an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference. The power difference may be an absolute difference between transmission power of the first system and transmission power of the second system when uplink signals are transmitted by the UE in the first system and the second system simultaneously.

In a possible embodiment of the present disclosure, prior to transmitting the intra-UE interference suppression capability information with respect to the intra-UE interference to the network side device, the processor 1501 is further configured to receive an inquiry message about the intra-UE interference suppression capability from the network side device.

In a possible embodiment of the present disclosure, when transmitting the intra-UE interference suppression capability information with respect to the intra-UE interference to the network side device, the processor 1501 is further configured to determine whether the UE is in an intra-UE interference scenario in accordance with acquired network frequency configuration information, and when the UE is in the intra-UE interference scenario, transmit the intra-UE interference suppression capability information with respect to the intra-UE interference to the network side device on its own initiative.

In a possible embodiment of the present disclosure, the intra-UE interference suppression capability information may include pre-detected and pre-stored intra-UE interference suppression capability information about the UE within the predicted frequency range.

In a possible embodiment of the present disclosure, the intra-UE interference suppression capability information may be used for the network side device to perform an interference avoiding operation within the predicted frequency range in accordance with the intra-UE interference suppression capability information.

In a possible embodiment of the present disclosure, the interference avoiding operation may include one or more of selecting a transmission mode, performing an avoidance scheduling operation, reducing an MCS, increasing downlink transmission power, and decreasing uplink transmission power.

In a possible embodiment of the present disclosure, subsequent to transmitting the intra-UE interference suppression capability information with respect to the intra-UE interference to the network side device, the processor 1501 is further configured to: when the intra-UE interference includes the harmonic interference and a difference acquired by subtracting the receiving signal sensitivity of the UE from downlink reception power of the UE in the second system is greater than a predetermined threshold, perform uplink transmission in the first system in accordance with an uplink scheduling instruction from the network side device, and when the difference acquired by subtracting the receiving signal sensitivity of the UE from the downlink reception power of the UE in the second system is not greater than the predetermined threshold, not perform the uplink transmission in the first system; or when the intra-UE interference includes the intermodulation interference and a difference acquired by subtracting the receiving signal sensitivity of the UE from downlink reception power of the UE in the first system is greater than a predetermined threshold, perform the uplink transmission in the first system and perform uplink transmission in the second system in accordance with an uplink scheduling instruction from the network side device, and when the difference acquired by subtracting the receiving signal sensitivity of the UE from the downlink reception power of the UE in the first system is not greater than the predetermined threshold, not perform the uplink transmission in the first system and the uplink transmission in the second system simultaneously.

It should be appreciated that, the implementation of the UE 1500 may refer to the relevant description in the capability information reporting method with a same beneficial effect, and thus will not be particularly defined herein.

Figure 16:
FIG. 16 is a schematic view showing an interference processing system according to one embodiment of the present disclosure.

The present disclosure further provides in some embodiments an interference processing system which, as shown in FIG. 16, includes a network side device 1601 and a UE 1602. The network side device 1601 may be the network side device mentioned hereinabove, and the UE 1602 may be the UE mentioned hereinabove, which will not be particularly defined herein.

The present disclosure further provides in some embodiments a computer-readable storage medium storing therein a resource configuration program. The resource configuration program is executed by a processor so as to implement the above-mentioned capability information reporting method for the network side device.

The present disclosure further provides in some embodiments a computer-readable storage medium storing therein a resource configuration program. The resource configuration program is executed by a processor so as to implement the above-mentioned capability information reporting method for the UE.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A capability information reporting method, comprising:
  acquiring a predicted frequency range of an intra-user equipment (UE) interference;
  receiving intra-UE interference suppression capability information from the UE; and
  performing an interference avoiding operation in accordance with the intra-UE interference suppression capability information, wherein when the intra-UE interference suppression capability information indicates that the UE has a weak interference suppression capability, the interference avoiding operation includes not scheduling the UE to perform a uplink transmission in a first system and to perform the uplink transmission in a second system simultaneously,
  wherein the intra-UE interference suppression capability information comprises intra-UE interference suppression capability information about the UE within the predicted frequency range.

2. The capability information reporting method according to claim 1, wherein the acquiring the predicted frequency range of the intra-UE interference comprises:
  calculating a first candidate predicted frequency range of the intra-UE interference within an uplink operating frequency range of the first system, and taking a first target frequency range within the first candidate predicted frequency range as the predicted frequency range, the first target frequency range being a frequency range located within the first candidate predicted frequency range and belonging to a downlink system bandwidth of the second system for the UE; or
  calculating a second candidate predicted frequency range of the intra-UE interference within the uplink operating frequency range of the first system and an uplink operating frequency range of the second system, and taking a second target frequency range within the second candidate predicted frequency range as the predicted frequency range, the second target frequency range being a frequency range located within the second candidate predicted frequency range and belonging to a downlink system bandwidth of the first system for the UE.

3. The capability information reporting method according to claim 1, wherein the intra-UE interference comprises: a harmonic interference caused by an uplink signal transmitted by the UE in the first system to a downlink signal received by the UE in the second system; or an intermodulation interference caused by the uplink signal transmitted by the UE in the first system and an uplink signal transmitted by the UE in the second system to a downlink signal received by the UE in the first system.

4. The capability information reporting method according to claim 3, wherein when the intra-UE interference comprises the harmonic interference, the intra-UE interference suppression capability information comprises a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference comprises the intermodulation interference, the intra-UE interference suppression capability information comprises an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference, wherein the power difference is an absolute difference between transmission power of the first system and transmission power of the second system when uplink signals are transmitted by the UE in the first system and the second system simultaneously.

5. The capability information reporting method according to claim 1, wherein the receiving the intra-UE interference suppression capability information from the UE comprises receiving the intra-UE interference suppression capability information with respect to the intra-UE interference reported by the UE on its own initiative.

6. The capability information reporting method according to claim 1, wherein the interference avoiding operation comprises one or more of selecting a transmission mode, performing an avoidance scheduling operation, reducing a downlink Modulation and Coding Scheme (MCS), increasing downlink transmission power, and decreasing uplink transmission power.

7. The capability information reporting method according to claim 6, wherein the performing the interference avoiding operation in accordance with the intra-UE interference suppression capability information comprises:

when the intra-UE interference comprises harmonic interference and a difference acquired by subtracting receiving signal sensitivity of the UE from downlink reception power of the UE in the second system is greater than a predetermined threshold, scheduling the UE to perform uplink transmission in the first system, and when the difference acquired by subtracting the receiving signal sensitivity of the UE from the downlink reception power of the UE in the second system is not greater than the predetermined threshold, not scheduling the UE to perform the uplink transmission in the first system; or when the intra-UE interference comprises intermodulation interference and a difference acquired by subtracting the receiving signal sensitivity of the UE from downlink reception power of the UE in the first system is greater than a predetermined threshold, scheduling the UE to perform the uplink transmission in the first system and perform uplink transmission in the second system, and when the difference acquired by subtracting the receiving signal sensitivity of the UE from the downlink reception power of the UE in the first system is not greater than the predetermined threshold, not scheduling the UE to perform the uplink transmission in the first system and perform the uplink transmission in the second system simultaneously.

8. A capability information reporting method for a UE, comprising:

transmitting intra-UE interference suppression capability information with respect to an intra-UE interference to a network side device; and when the intra-UE interference suppression capability information indicates that the UE has a weak interference suppression capability, not performing an uplink transmission in a first system and an uplink transmission in a second system simultaneously, wherein the intra-UE interference suppression capability information comprises intra-UE interference suppression capability information about the UE within a predicted frequency range, and the UE is to be influenced by the intra-UE interference within the predicted frequency range.

9. The capability information reporting method according to claim 8, wherein the predicted frequency range comprises:

a frequency range located within a first candidate predicted frequency range and belonging to a downlink system bandwidth of a second system for the UE, the first candidate predicted frequency range being a candidate predicted frequency range of the intra-UE interference within an uplink operating frequency range of a first system for the UE; or a frequency range located within a second candidate predicted frequency range and belonging to a downlink system bandwidth of the first system for the UE, the second candidate predicted frequency range being a candidate predicted frequency range of the intra-UE interference within the uplink operating frequency range of the first system for the UE and an uplink operating frequency range of the second system for the UE.

10. The capability information reporting method according to claim 8, wherein the intra-UE interference comprises: a harmonic interference caused by an uplink signal transmitted by the UE in the first system to a downlink signal received by the UE in the second system; or an intermodulation interference caused by the uplink signal transmitted by the UE in the first system and an uplink signal transmitted by the UE in the second system to a downlink signal received by the UE in the first system.

11. The capability information reporting method according to claim 10, wherein when the intra-UE interference comprises the harmonic interference, the intra-UE interference suppression capability information comprises a harmonic interference isolation performance, indication information indicating whether intra-UE interference suppression capability of the UE meets a predetermined intra-UE interference suppression capability index requirement, receiving signal sensitivity information about the UE, or indication information indicating a receiving signal sensitivity degradation of the UE; or when the intra-UE interference comprises the intermodulation interference, the intra-UE interference suppression capability information comprises an intermodulation interference isolation performance, indication information indicating whether the intra-UE interference suppression capability of the UE meets a predetermined intra-UE interference suppression capability index requirement, receiving signal sensitivity information about the UE, indication information indicating a receiving signal sensitivity degradation of the UE, or an isolation performance of the UE with respect to at least one power difference, wherein the power difference is an absolute difference between transmission power of the first system and transmission power of the second system when uplink signals are transmitted by the UE in the first system and the second system simultaneously.

12. The capability information according to claim 8, wherein prior to transmitting the intra-UE interference suppression capability information with respect to the intra-UE interference to the network side device, the capability information reporting method further comprises receiving an inquiry message about the intra-UE interference suppression capability from the network side device.

13. The capability information reporting method according to claim 8, wherein the transmitting the intra-UE interference suppression capability information with respect to the intra-UE interference to the network side device comprises determining whether the UE is in an intra-UE interference scenario in accordance with acquired network frequency configuration information, and when the UE is in the intra-UE interference scenario, transmitting, by the UE, the intra-UE interference suppression capability information with respect to the intra-UE interference to the network side device on its own initiative.

14. The capability information reporting method according to claim 8, wherein the intra-UE interference suppression capability information comprises pre-detected and pre-stored intra-UE interference suppression capability information about the UE within the predicted frequency range.

15. The capability information reporting method according to claim 8, wherein the intra-UE interference suppression capability information is used for the network side device to perform an interference avoiding operation in accordance with the intra-UE interference suppression capability information.

16. The capability information reporting method according to claim 15, wherein the interference avoiding operation comprises one or more of selecting a transmission mode, performing an avoidance scheduling operation, reducing an MCS, increasing downlink transmission power, and decreasing uplink transmission power.

17. The capability information reporting method according to claim 16, wherein subsequent to transmitting the intra-UE interference suppression capability information with respect to the intra-UE interference to the network side device, the capability information reporting method further comprises:

when the intra-UE interference comprises harmonic interference and a difference acquired by subtracting receiving signal sensitivity of the UE from downlink reception power of the UE in the second system is greater than a predetermined threshold, performing uplink transmission in the first system in accordance with an uplink scheduling instruction from the network side device, and when the difference acquired by subtracting the receiving signal sensitivity of the UE from the downlink reception power of the UE in the second system is not greater than the predetermined threshold, not performing the uplink transmission in the first system; or when the intra-UE interference comprises intermodulation interference and a difference acquired by subtracting the receiving signal sensitivity of the UE from downlink reception power of the UE in the first system is greater than a predetermined threshold, performing the uplink transmission in the first system and performing uplink transmission in the second system in accordance with an uplink scheduling instruction from the network side device, and when the difference acquired by subtracting the receiving signal sensitivity of the UE from the downlink reception power of the UE in the first system is not greater than the predetermined threshold, not performing the uplink transmission in the first system and the uplink transmission in the second system simultaneously.

18. A user equipment (UE), comprising a processor, a memory, a network interface and a user interface, wherein the processor, the memory, the network interface and the user interface are coupled together via a bus system, and the processor is configured to read a program stored in the memory so as to implement the capability information reporting method for a UE, comprising:

transmitting intra-UE interface suppression capability information with respect to an intra-UE interference to a network side device; and when the intra-UE interference suppression capability information indicates that the UE has a weak interference suppression capability, not performing an uplink transmission in a first system and an uplink transmission in a second system simultaneously, wherein the intra-UE interference suppression capability information comprises intra-UE interference suppression capability information about the UE within a predicted frequency range, and the UE is to be influenced by the intra-UE interference within the predicted frequency range.

19. The UE according to claim 18, wherein the predicted frequency range comprises:

a frequency range located within a first candidate predicted frequency range and belonging to a downlink system bandwidth of a second system for the UE, the first candidate predicted frequency range being a candidate predicted frequency range of the intra-UE interference within an uplink operating frequency range of a first system for the UE; or a frequency range located within a second candidate predicted frequency range and belonging to a downlink system bandwidth of the first system for the UE, the second candidate predicted frequency range being a candidate predicted frequency range of the intra-UE interference within the uplink operating frequency range of the first system for the UE and an uplink operating frequency range of the second system for the UE.

20. The UE according to claim 18, wherein the intra-UE interference comprises: a harmonic interference caused by an uplink signal transmitted by the UE in the first system to a downlink signal received by the UE in the second system; or an intermodulation interference caused by the uplink signal transmitted by the UE in the first system and an uplink signal transmitted by the UE in the second system to a downlink signal received by the UE in the first system.

* * * * *